No. 877,234.
PATENTED JAN. 21, 1908.
S. W. RUSHMORE.
ACETYLENE GENERATOR.
APPLICATION FILED MAY 27, 1905.
2 SHEETS—SHEET 1.
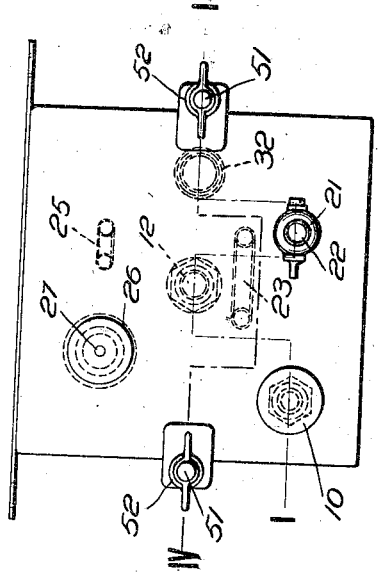
Fig.II.
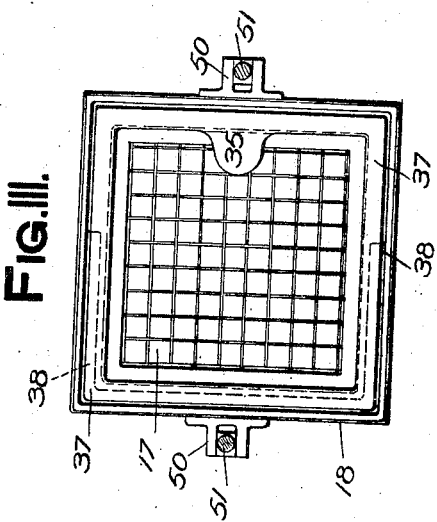
Fig.III.
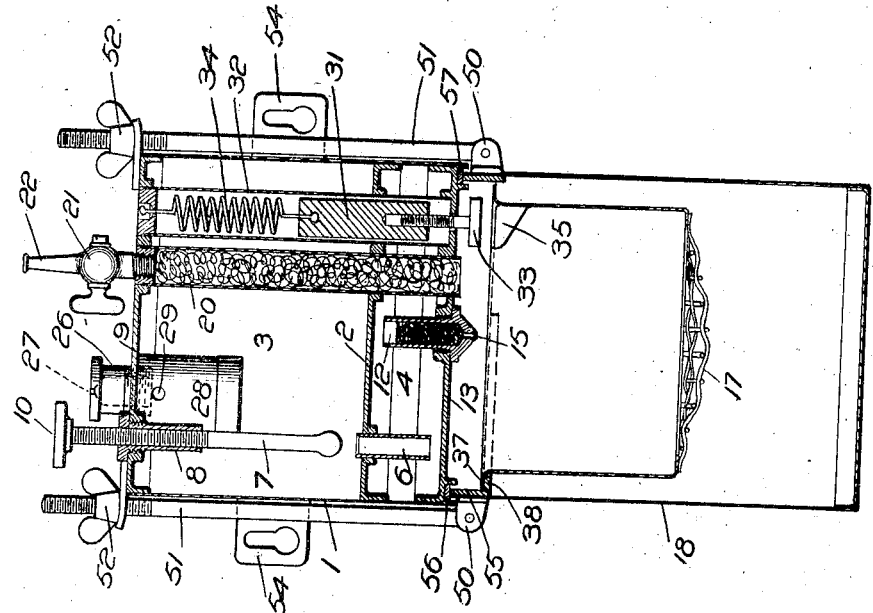
Fig.I.
WITNESSES:
INVENTOR
Samuel W. Rushmore
BY
Alfred Wilkinson
ATTORNEY No. 877,234. PATENTED JAN. 21, 1908.
S. W. RUSHMORE.
ACETYLENE GENERATOR.
APPLICATION FILED MAY 27, 1905.
2 SHEETS—SHEET 2.
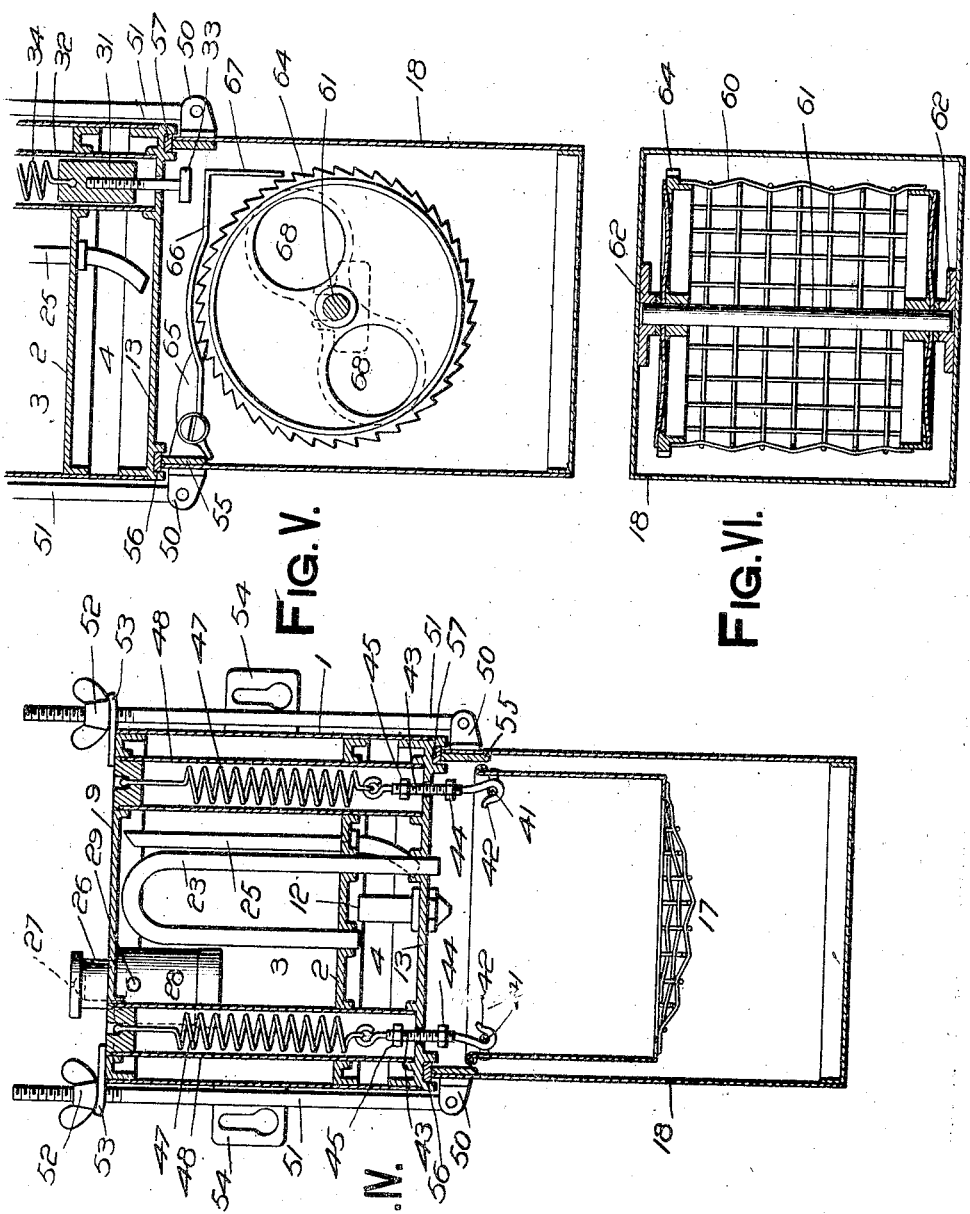

UNITED STATES PATENT OFFICE.

SAMUEL W. RUSHMORE, OF PLAINFIELD, NEW JERSEY.

ACETYLENE-GENERATOR.

No. 877,234.          Specification of Letters Patent.          Patented Jan. 21, 1908.

Application filed May 27, 1905. Serial No. 262,583.

*To all whom it may concern:*

Be it known that I, SAMUEL W. RUSHMORE, a citizen of the United States, residing at Plainfield, in the county of Union and State of New Jersey, have invented certain new and useful Improvements in Acetylene-Gas Generators; and I do hereby declare the following to be a full, clear, and exact description of the invention, such as will enable others skilled in the art to which it appertains to make and use the same.

My invention relates to acetylene gas generators suitable for use in vehicles or boats, and has for its object to produce a generator that shall generate gas at a uniform pressure and as required only, so that there shall be no waste of carbid when the demand for gas has ceased.

An important feature of my invention consists in means for causing a secondary movement in the basket containing the calcium carbid, so that all the slaked lime shall immediately be shaken down, leaving the calcium carbid exposed to the water in clean lumps. It has been found by experience, that in similar generators in ordinary use, there is not sufficient movement positively and certainly to shake down the dust, whereby it occurs, that, as the lime is slaked more or less of the dust remains in the basket, and, becoming mixed with the surplus water, causes waste and irregularity in the generation of gas, or, from the surplus supply of water, becomes mixed into mud and caked, after it is shaken down into the lower or basket shell.

I have conceived the possibility of overcoming these disadvantages and have devised means for that purpose, consisting in any suitable means operated by the movement of the vehicle or vessel, for constantly, or frequently, moving or jarring the basket, so that the slaked lime is immediately shaken down into the lower or basket shell in the form of dry dust and all the water utilized in the generation of gas, without waste of water or the formation of mud.

My invention also lies in the general construction of my generator and in other features and details thereof.

I have shown desirable forms of generators embodying my invention in the drawings herewith, in which the reference numerals of the specification indicate the corresponding parts in all the figures.

Figure I is a vertical section of my generator on line I of Fig. II. Fig. II is a top plan thereof. Fig. III is a top plan of the basket-shell and basket separated from the upper or tank-shell. Fig. IV is a section taken on line IV of Fig. II, with a second spring holding tube added for a modified means for sustaining and moving the basket. Figs. V and VI are respectively vertical section and top plan of the lower shell, showing a desirable modification in the form of my device.

Referring more particularly to Figs. I to IV, inclusive, my generator may conveniently be made of a main case of square or cylindrical form and in two parts, for convenience in replacing the supply of calcium carbid and removing the slaked lime and dust, of which 1 indicates the upper or tank-shell, divided by partition 2 into the water tank or reservoir 3 and the smaller regulating chamber 4.

6 is a valve tube for the water supply, connecting the lower portion of the tank with the lower portion of the regulating chamber. This may be closed by the ball-end-valve 7, fitted to threaded bearing 8, in the top wall 9 of the tank shell, and having the external thumb-piece 10.

12 is a removable overflow tube fitted to a threaded bearing in the lower wall 13 of the tank-shell, through which the water drips onto the calcium carbid in receptacle or basket 17, supported as hereinafter described in the generating chamber in the lower or tank-shell 18. This overflow tube is provided with the small drip hole 15 through the nose at its lower end, and is preferably provided with a piece of felt, or similar stuffing, to prevent the water from passing too rapidly.

20 is the gas tube, from the generating chamber through the regulating chamber and tank, provided with the external gas valve 21, for controlling the supply of gas through nozzle 22 to the burners. This gas tube is preferably filled with hair, or other suitable fibrous material, for cleansing the gas.

23 is the curved or U-shaped tube connecting the top of the generating chamber with the top of the regulating chamber and extending up into the tank above the water line.

25 is a safety-pressure tube extending from the bottom of the regulating chamber to the top of the tank.

26 is a screw stopper for the water supply opening in the top wall, provided with vent hole 27, and 28 is a tube also supplied with a vent hole 29, and arranged around the water supply hole, to prevent the danger of the water splashing out.

The operation of my device is as follows—the basket being sufficiently supplied with calcium carbid and the tank being filled with water, the valve 7 is raised, so that the water will flow down through tube 6, sufficiently filling regulating chamber 4, so that the water will overflow through tube 12 and drip onto the carbid. The gas, instantly generated, passes through the gas tube 20 to the burners, and at the same time a portion of the gas passes through the U-shaped tube 23 into the regulating chamber 4, and, by its pressure, forces some of the water back through valve tube 6 into the tank, thus preventing its overflow through overflow tube 12 and immediately checking the generation of gas. As the gas is gradually drawn off to the lights, the pressure, thus exerted in the regulating chamber 4, will fall, the water will flow back from the tank into the regulating chamber until it rises sufficiently high therein, again to overflow through the overflow tube, when the action is repeated.

It has been found in practice, that, if the valve 21 is suddenly closed when the generator is in action, there will be a small after-generation of gas; this will pass through the tube 23, force all the water back from the regulating chamber into the tank and then escape through valve tube 6 and the water, to vent holes 27 and 29, avoiding the danger of excessive gas pressure.

If both of the valves 21 and 7 are suddenly closed and an excessive pressure is generated, the water will be forced through tube 25 back into the tank and the gas will then escape through said tube and the vent holes as before. It will be understood that as the upper end of said tube 25 extends above the water line in the tank no water can return through it to regulating chamber 4, nor will any water flow up through it unless valve 7 is closed.

The basket or carbid carrier is provided with an openwork bottom, preferably lower at its center than at the sides, so as to tend to bring the calcium carbid immediately under the overflow tube, preferably centrally arranged, and, I support the basket, not solidly in the shell, but movably or unstably, so that it is frequently or constantly subjected to movement, shock or vibration, independent of the movement of the shell, constantly to shake down the dust, from the basket, maintaining the carbid, clean, and leaving only dry dust in the bottom of the shell.

It will be understood that to shake down the dust, the best movement of the basket is a jar or shock, and for that purpose, the mechanism shown in Figs. I and III has proved successful and satisfactory in practice. Immediately above the basket and arranged so that it will strike the edge of the basket or some other portion, is arranged a vibrating weight 31. This may be arranged, hung in a tube 32 on an elastic spring 34, as shown in Fig. I, and with an adjustable tapper 33, downwardly extending through the lower wall 13 of the upper shell adjacent to a lip 35 on the basket. It will be understood that the tapper may be adjusted, so that as the vehicle moves, the weight vibrates on its spring and strikes the lip or edge of the basket, by which frequent percussive blows, the dust is constantly shaken down.

To permit a greater movement or tilting of the basket, it is supported by its flange 37 on shoulder 38, extending around a portion only of the shell, the basket on the side adjacent to the lip being unsupported, so that it is tilted down on that side by the blow of the weight.

The foregoing is the preferred practical form of my invention, but many other forms may be adopted without departing from the spirit of my invention. For instance, as shown in Fig. IV, with eyes 41 on the upper edge of the basket, engage the hooks 42, having threaded shanks 43, to which are fitted the lower nuts 44 and the upper nuts 45. These shanks extend through openings in the lower wall of the tank shell, and are suspended on springs 47 or equivalent resilient supports, which may be arranged in any convenient way and desirably in sealed tubes 48 extending upwardly through the regulating chamber and the tank, said spring supports having their upper ends secured in the top wall. These springs are so adjusted, or provided of such a strength, as to sustain the basket substantially in the position shown when containing half the normal charge of calcium carbid. When the basket is fully loaded, the extra weight will stretch the springs so that the weight will come on the upper nuts 45; when nearly empty, the springs will draw the basket up so that the lower nuts 44 will engage with the lower wall. Thus the ordinary movement of the vehicle or boat, carrying the generator, will cause the basket to vibrate up and down on its springs, and receive a constant shock or percussion from the engagement of the nuts with the lower wall of the shell, thus constantly to shake down the waste lime.

Another modification is shown in Figs. V and VI. Here a cylindrical openwork basket 60, carried on a horizontal shaft 61 fitted to suitable bearings 62 in opposite sides of the lower shell, is provided at one end with a ratchet 64, with which engages dog 65 to prevent backward rotation, and with a flexible, or springlike, pawl 66, maintained adjacent to the ratchet teeth and out of contact therewith by means of its tail 67 engaging with the rim f the generator shell. In connection with this, is arranged a spring supported weight and tapper, substantially the same as that of Fig. I, which is moved to vibrate by the motion of the vehicle and to engage with the yielding pawl, which, in turn, engages with the ratchet teeth to rotate the cylindrical basket and sift down the waste lime dust.

Supply openings 68 in the end of the basket may be closed by any suitable cover.

50 are ears on the upper edge of the lower shell to which are fitted arms 51, provided with thumb screws 52, and adapted to engage with the hasps or ears 53 on the upper shell, to secure the upper shell on the lower.

54 are side flanges provided with screw eyelets for securing the complete generator in position.

55 is a desirable reinforcing band for the upper edge of lower shell. The upper shell may desirably be provided with a grooved lower margin 56 for receiving a gasket 57 to engage with the reinforcing band.

The basket supported on the partial shoulder, as shown in Figs. I and III, will tend to rock with the movement of the vehicle and to some extent accomplish the desired result, without the intervention of the weight, but I consider, as desirable, the weight with the tapper, or other form of lower end, extending adjacent to the oasket.

While I have stated that the basket is moved or jarred by means operated by the movement of the vehicle, yet it is evident that such means may be operated by other power, such as clock work, without departing from my invention.

It will be understood that I do not desire to limit myself to the form of devices here shown, but to claim broadly the means for suitably supporting the basket and imparting thereto a shock or movement, independent of the ordinary shocks or movement of the generator as a whole on the vehicle.

It will be understood that the curved tube 23 may extend up in the tank to any desired height. As shown in Fig. IV it is preferably carried above the water line to prevent its acting as a water-feed to the carbid, in case the overflow tube 12 is choked and the regulating chamber 4 is flooded, and for no other reason.

Having thus described my invention, what I claim as new and desire to secure by Letters Patent, is:—

1. In an acetylene gas generator, the combination with a main inclosing case, of a calcium carbid basket unstably supported therein, and means arranged in the case to impart a sudden shock to the basket, said means being operated by the shocks or jars sustained by the generator.

2. In an acetylene gas generator, the combination with the main case, of a basket having an openwork bottom for the calcium carbid, means to deliver water onto the carbid, and an oscillating weight arranged to strike the basket.

3. In an acetylene gas generator, the combination with the main case, of a carbid basket having an openwork bottom unstably supported in the lower portion of the case, a water reservoir arranged in the upper portion of the case to drip water onto the carbid, and a weight secured to an elastic carrier and arranged to strike the basket.

4. In an acetylene gas generator for a vehicle, the combination with a main case composed of upper and lower shells, of a carbid basket supported in the lower shell, said basket having an openwork bottom lower at its center, a weight, means in the upper shell for suspending the same and constructed to be vibrated by the movement of the vehicle to strike the basket.

5. In an acetylene gas generator for vehicles, the combination with a main case composed of upper and lower shells, of a shoulder near the top of the lower shell extending around a portion only of the shell, a carbid basket supported on said shoulder by a flange ngaging with said shoulder, and a weight arranged on an elastic support in the upper shell and adapted to strike the portion of the basket not supported on the shoulder.

6. An acetylene gas generator for a vehicle having in combination a main case composed of upper and lower shells, a water tank in the upper shell, an inner shoulder on the upper margin of the lower shell, said shoulder extending around a portion only of said margin, a calcium carbid basket having an openwork lower portion lower at its center and an outwardly extending flange at its upper margin, the basket being supported by the engagement of said flange with said partial shoulder, whereby the basket is not directly supported at one side, a lip on the basket at said unsupported side, a tube vertically arranged in the upper shell, a coil spring arranged in said tube and having one end secured in the upper end thereof, a weight secured on the lower end of the spring in said tube, an adjustable tapper attached to the lower end of the weight and extending downwardly through the lower wall of the upper shell adjacent to said lip and adapted to strike the lip and jar the basket, as the vehicle moves and means intermittingly to deliver water from the reservoir onto the carbid in the basket, substantially as described and shown.

7. In an acetylene gas generator, the combination with a main case composed of upper and lower shells, of means to secure the upper shell on the lower, a carbid basket having an openwork bottom supported in the upper portion of the lower shell, said upper shell being provided with a top wall, a lower wall and an intermediate partition dividing said upper shell into a larger water tank above and a regulating chamber below, a valve tube connecting the bottom of the tank to the bottom of the regulating chamber, a valve to close said tube, an overflow tube centrally arranged in the regulating chamber, extending upwardly adjacent to the top of said chamber and provided with a small drip hole for the flow of water onto the carbid, a gas tube from the generating chamber in the lower shell extending upwardly through the regulating chamber and tank, an external valve provided with a nozzle on the upper end of said gas tube, a curved tube connecting the top of the generating chamber with the top of the regulating chamber and extending upwardly above the water line in the tank, a safety pressure tube connecting the bottom of the regulating chamber with the top of the tank, the top wall of the upper shell being provided with a water supply opening, a screw stopper fitted to said opening and provided with a vent hole, and an inner tube arranged around said water supply opening and provided with a vent hole near its upper end, substantially as described and shown.

8. As a new article of manufacture, an acetylene gas generator having in combination a lower shell with an open top and a reinforced upper margin, forming a carbid chamber, an integral flange on the shell adjacent to the upper margin, a carbid basket having an openwork lower portion supported on said flange, an upper shell having a lower wall, a grooved lower margin and a closed upper wall, a gasket in said groove to engage with the top of the lower shell, a partition dividing the upper shell into an upper water tank and a lower, narrower regulating chamber, a removable overflow tube fitted to the threaded central bearing in the lower wall and having at its lower end a nozzle with a small drip hole and a stuffing of porous material, a valve tube fixed in the partition and extending down from the water reservoir into the lower portion of the regulating chamber. a threaded shank sustained in the top of the upper shell, a valve for said valve tube on the lower end of said shank, an external thumbpiece on the shank, a stopper fitted to a water supply inlet in the top of the upper shell, a gas tube secured in the upper shell and extending therethrough from the generating chamber, a stuffing of fibrous material in the gas tube, a valve in the gas tube, opposite outwardly extending ears on the upper edge of the lower shell, corresponding, opposite, outwardly extending hasps on the top of the upper shell, arms pivotally secured to the ears, and thumb-screws fitted to the threaded ends of said arms to engage with the hasps.

In testimony whereof I affix my signature in presence of two witnesses.

SAMUEL W. RUSHMORE.

Witnesses:
LOUIS OLSON BARTON.
WARREN H. MARSH.